May 19, 1931. R. T. ROMINE 1,806,086
PORTABLE LOADING PLATFORM
Filed July 3, 1926 2 Sheets-Sheet 1
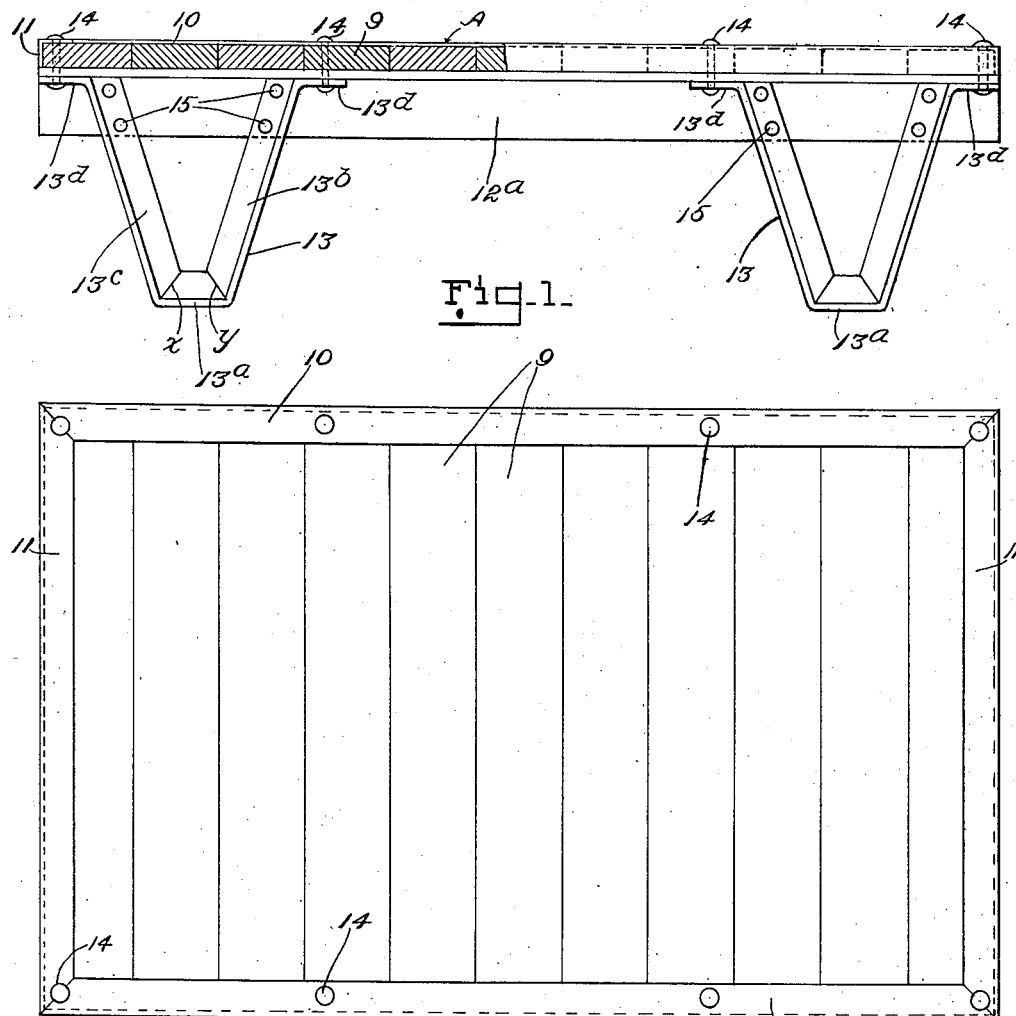
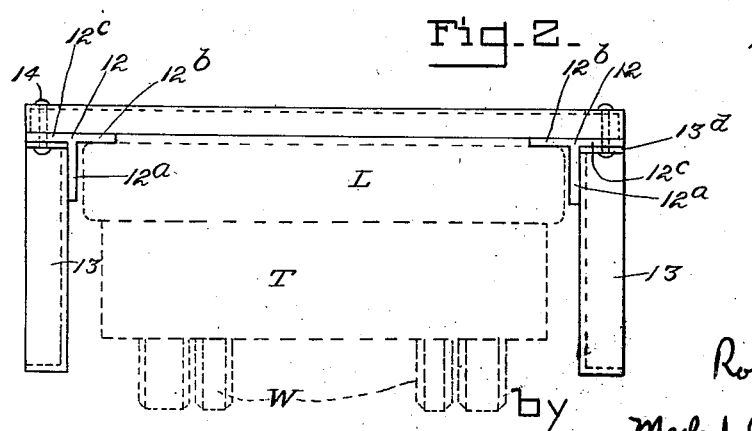
INVENTOR:
Robert T. Romine
by Macleod, Colver, Copeland & Dike
ATTORNEYS

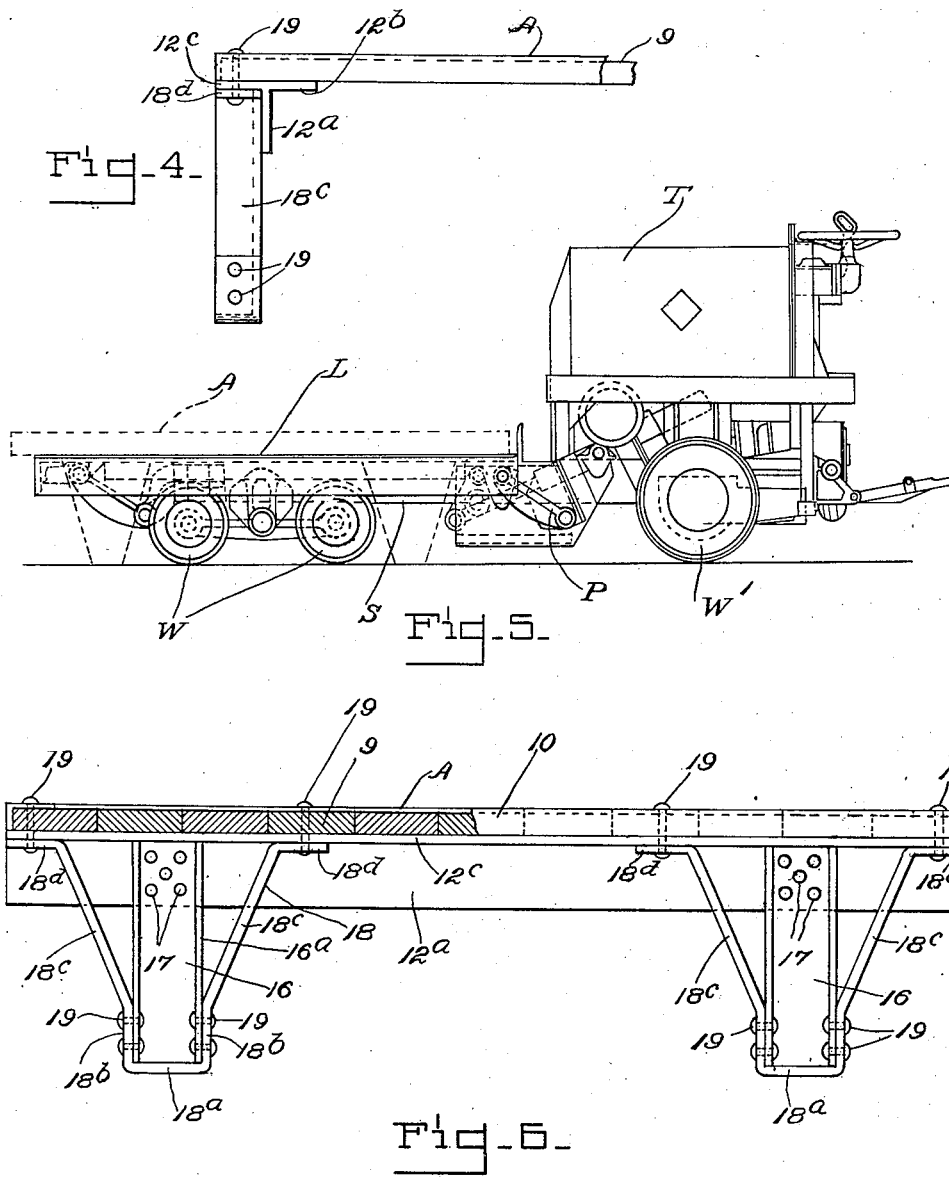

Patented May 19, 1931

1,806,086

UNITED STATES PATENT OFFICE

ROBERT T. ROMINE, OF MOUNT CLEMENS, MICHIGAN

PORTABLE LOADING PLATFORM

Application filed July 3, 1926. Serial No. 120,302.

This invention relates to portable platforms, particularly adapted for use with industrial trucks of the load elevating or lift platform type and constructed to permit the truck platform to be propelled or introduced beneath the floor boards of the platform to lift the same and transport it to a predetermined destination.

An object of the invention is to provide an improved platform of this class which is capable of supporting in use extraordinarily heavy loads, such as ten and fifteen ton loads, and adapted to be readily picked up with such loads by a lift truck without any damage to the platform.

A further object of the invention is to provide a portable platform capable of use in connection with very heavy loads and which at the same time will be relatively light and simplified in construction, inexpensive to manufacture and having improved supporting means or legs capable of sustaining the loads as well as impacts or blows to which the legs are frequently subjected in use, without buckling or collapsing.

Other objects of this invention will appear in the following description and appended claims reference being had to the accompanying drawings forming a part of this specification wherein like reference characters designate corresponding parts in the several views.

Fig. 1 is a side elevation, partly broken away, illustrating one form of platform embodying my invention.

Fig. 2 is a plan view thereof.

Fig. 3 is an end elevation diagrammatically illustrating the lift truck beneath the platform.

Fig. 4 is a fragmentary end view illustrating another form of platform embodying my invention.

Fig. 5 is a side view showing one of the power driven lift trucks in connection with which the portable platforms are used, and Fig. 6 is a side elevation, partly broken away, showing the type of platform illustrated in Fig. 4.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The present improved portable platform in its preferred form herein shown and described comprises in general a platform top or load carrying floor preferably formed of a multiplicity of cross boards, and a supporting truss is mounted beneath the floor so as to extend along each of a pair of opposite sides of the platform beneath the floor boards. Each truss member in accordance with the present invention comprises a steel T-bar and these bars provide spaced vertical flanges forming a guideway for the lift truck platform. The top horizontal flange of each T-bar forms a broad bearing surface for supporting the bottom of the platform at each longitudinal side. Leg supports are mounted at the outer sides of the vertical flanges of the T-bars and these legs may be constructed either of bent angle irons secured to both the vertical and inner horizontal flanges of the T-bars as shown in Fig. 1; or may be constructed of vertical channel bars riveted to the vertical flanges of the T-bars and reenforced by means of substantially U-shaped steel straps or bars embracing the lower ends of the channel members, as shown in Figs. 4 and 6.

Referring to the drawings, the portable platform in the present instance comprises a suitable floor A preferably comprising a number of cross members or boards 9. The platform floor is protected and reenforced around its four edges, as shown in Figs. 1 and 2, by means of a rectangular metallic frame. This frame may comprise angle bars or strips 10 at the opposite longitudinal side edges of the platform and similar angle bars 11 at the opposite end edges of the platform. It will be seen that these angle bars confine the edges of the platform boards and act to protect them against wear and collisions.

The load carrying platform or floor A is supported from beneath preferably along each longitudinal side edge by means of a one-piece metal truss member 12 preferably constructed in the form of a rolled steel T-bar.

Each of the T-bars or beams 12 comprises a central vertical flange 12a, and an upper flat horizontal flange bearing against the bottom of the cross boards 9, this upper horizontal flange of the T forming an inner flange portion 12b and an outer flange portion 12c, extending inwardly and outwardly with respect to the vertical flange 12a.

Referring to Fig. 1, the platform is provided with a pair of substantially V-shaped legs at each longitudinal side thereof, these legs being positioned at the outer faces of the vertical flanges 12a. In the construction illustrated in Figs. 1 to 3 inclusive each leg 13 is formed from a single angle iron bar. This bar is first slit at x and y and then bent upwardly in a substantially V or U-shaped form to provide a flat supporting foot 13a and upwardly diverging sides 13b and 13c. The angle bar at its upper ends is bent to provide flat portions 13d which are riveted at 14 to the frame members 10. It will be understood that in providing the flat attaching portions 13d, a portion of one of the flanges or webs of the angle iron may be burned off or otherwise removed. After the leg has been bent up into the proper form, the slits x and y are preferably closed by welding. It will be seen that the inner flanges 13b and 13c of the leg are riveted at 15 to the vertical flange 12a of the T-bar, the other flanges 13d which are at right angles to the flanges 13b and 13c are riveted at 14 to another flange of each T-bar. Thus the legs and T-bars are secured together at points at right angles to each other providing a strong and powerful supporting structure and resisting collapsing or buckling movement of the legs inwardly or outwardly or in a longitudinal direction.

In the construction shown in Figs. 4 and 6, the platform floor A is constructed in the same manner as previously described and this floor is supported through the medium of T-bars 12 in the same manner as shown in Figs. 1 to 3 inclusive. In this instance, however, each supporting leg for the platform comprises a vertical channel bar 16 having the central web thereof positioned against the outer face of the vertical flange 12a of the T-bar and riveted thereto as indicated at 17. As will be observed from an inspection of Figure 6, the bar 16 abuts at its upper end the horizontal flange 12c, whereby thrust is conveyed to the T-bar directly through the channel bar 16 and without imposing excessive strain upon the rivets 17. Each leg also comprises a steel bar or strap 18 which is bent into substantial V or U-shape so as to embrace the lower end of the channel bar or post 16. The leg portion 18 is thus bent or formed with a U-portion comprising a flat foot 18a and vertical sides 18b forming a pocket into which the lower end of the channel member 16 fits. The sides 18b are riveted to the flanges 16a of the channel member. The bar 18 is also bent or formed above the pocket formed by the portions 18a and 18b, to provide diverging or flaring sides 18c which abut against the vertical flange 12a of the T-bar and which at the outer ends are bent to provide flat attaching portions 18d riveted at 19 to the flange 12c of the T-bar and also to the frame member 10.

From the foregoing construction, it will be seen that the legs in this instance will have considerable strength so as to prevent buckling or collapsing in any direction irrespective of the weight of load placed upon the platform.

The present improved portable platforms are particularly adapted for use in connection with power driven lift trucks such as shown in Fig. 5. The truck illustrated in this figure may be built in accordance with my co-pending application Serial No. 172,165, filed March 2, 1927, and in general comprises a load elevating or lift platform L beneath which are mounted a number of load carrying wheels W preferably eight in number and carried by the low mounted chassis frame S. The platform L is raised and lowered by means of mechanism indicated in general at P which mechanism is operated from an electric motor. The propelling wheels W' are driven from an electric motor and all of the wheels of the truck are steered by a common mechanism which enables the wheels to be turned about a single turning centre at all times.

When the truck T is propelled so as to introduce or insert the platform L beneath the portable platform A, the truck platform will be guided into proper position by means of the vertical guide flanges 12a. When the lift platform L is raised so as to lift the portable platform A with its load from the floor, the upward thrust of the lift platform L will be received by the flange portions 12b of the T-bars, thereby distributing the thrust longitudinally of the platform and preventing any of the boards of the platform from breaking off.

What I claim is:

1. In a portable platform, the combination of a platform floor, a pair of parallel truss members mounted beneath said floor and extending along opposite sides thereof, each truss member comprising vertical and horizontal flanges, and supporting means at the outer side of each truss member and comprising a vertical channel member secured thereto and a substantially U-shaped bar embracing the bottom and sides of said channel member at its lower end and having diverging sides secured to the truss member.

2. In a portable platform, the combination of a platform floor, a pair of parallel T-shaped truss members mounted beneath said floor and extending along opposite sides thereof, each truss member comprising a vertical portion acting as a guide for a lift truck and also comprising inwardly and outwardly extending horizontal flanges united to said vertical portion, and supports located entirely at the outer sides of said vertical portions, each support comprising a vertical channel member having a central web secured to the vertical portion and outwardly extending parallel vertical flanges united to said web substantially the length of the support.

3. In a portable platform, a load supporting floor, a pair of truss bars angular in cross section extending beneath the floor along opposite sides thereof, legs mounted entirely outside said bars, each leg comprising a vertical channel bar having parallel outwardly extending side flanges and a central web extending the length thereof, and a bar having a portion embracing the lower end of the channel bar and a portion extending therefrom outwardly away from the channel bar and secured to one of the truss bars.

4. In a portable platform, a floor, truss members angular in cross section extending beneath the floor along opposite sides thereof, each having a vertical guide flange, supporting legs each comprising a vertical channel bar having a central web secured back to back with said vertical guide flange and also having outwardly projecting parallel vertical flanges joined to said central web, and a brace bar secured to the lower end of said channel bar and extending upwardly and outwardly into engagement with the truss member at a point spaced from the upper end of the channel bar.

5. In a portable platform, a floor, truss members angular in cross section extending beneath the floor along opposite sides thereof, each having a vertical guide flange, supporting legs each comprising a vertical channel bar having a central vertical web secured back to back with said vertical guide flange and also having outwardly projecting parallel vertical flanges joined to said central web, and a brace bar embracing the lower end of said channel bar and secured to the truss members at points spaced from the upper end of the channel bar at opposite sides thereof.

In testimony whereof I affix my signature.

ROBERT T. ROMINE.